United States Patent
Jayadev et al.

(10) Patent No.: US 6,713,986 B1
(45) Date of Patent: Mar. 30, 2004

(54) CONTROLLER FOR AIR CONDITIONERS AND HEAT PUMPS

(75) Inventors: Tumkur S. Jayadev, San Jose, CA (US); James C. Sprout, Los Altos, CA (US)

(73) Assignee: Energy Savers International, San Jose, CA (US)

( * ) Notice: Subject to any disclaimer, the term of this patent is extended or adjusted under 35 U.S.C. 154(b) by 0 days.

(21) Appl. No.: 10/305,933

(22) Filed: Nov. 26, 2002

(51) Int. Cl.[7] .................................................. H02P 5/28
(52) U.S. Cl. ........................ 318/753; 318/774; 318/799; 318/779; 318/807
(58) Field of Search ................................ 318/753, 799, 318/779, 807

(56) References Cited

U.S. PATENT DOCUMENTS

| | | |
|---|---|---|
| 360,223 A | 3/1887 | Johnson |
| 2,120,883 A | 6/1938 | Brace et al. |
| 2,860,833 A | 11/1958 | McElgin et al. |
| 3,035,760 A | 5/1962 | Simmons |
| 3,674,203 A | 7/1972 | McGrath |
| 4,279,012 A | 7/1981 | Beckerdorff et al. |
| 4,510,576 A | 4/1985 | MacArthur et al. |
| 4,611,470 A | 9/1986 | Enstrom |
| 4,776,385 A | 10/1988 | Dean |
| 4,885,914 A | 12/1989 | Pearman |
| 5,300,871 A * | 4/1994 | Bucher et al. ............... 318/794 |
| 5,325,034 A * | 6/1994 | Reynolds et al. ............ 318/782 |
| 5,796,234 A * | 8/1998 | Vrionis ........................ 318/751 |
| 5,808,441 A * | 9/1998 | Nehring ....................... 318/751 |
| 6,121,749 A * | 9/2000 | Wills et al. .................. 318/811 |
| 6,208,113 B1 * | 3/2001 | Lelkes et al. ................ 318/807 |
| 6,570,778 B2 * | 5/2003 | Lipo et al. ..................... 363/41 |

* cited by examiner

*Primary Examiner*—Rita Leykin
(74) *Attorney, Agent, or Firm*—Nydegger & Associates

(57) ABSTRACT

A speed controller for a single phase motor such as a permanent split capacitor motor allows the motor to be operated at a first speed, $n_1$, and a lower speed, $n_2$. High speed motor operation is produced by passing a single phase AC current through both the main and auxiliary windings of the motor. For low speed operation, the controller passes first and second reduced frequency AC waveforms through the motor's auxiliary and main windings, respectively. The first waveform bypasses the motor's auxiliary winding capacitor and is phase shifted 90 degrees from the second AC waveform. A split source capable of generating an AC signal and its inverted signal can be used by the controller to generate the reduced frequency waveforms. Specifically, the controller uses selected half cycles from each split source signal to produce the reduced frequency waveforms.

20 Claims, 3 Drawing Sheets

CONTROLLER FOR AIR CONDITIONERS AND HEAT PUMPS

FIELD OF THE INVENTION

The present invention pertains generally to devices for controlling the speed of a single phase motor. More particularly, the present invention pertains to controllers for controlling motor speed in air conditioners and heat pumps. The present invention is particularly, but not exclusively, useful as a two-speed motor controller for reducing the energy consumption of air conditioning and heat pump applications.

BACKGROUND OF THE INVENTION

A large percentage of air conditioners and heat pumps in residential applications are driven by single phase, permanent split capacitor (PSC) motors. Although PSC motors can be designed for high efficiency, the high efficiency is generally only realized for one load condition. In fact, the efficiency drops off rapidly as the load on the motor decreases from the optimal load. Unfortunately, the motor in an air conditioner works most of the time at fractional load, and accordingly, a considerable amount of energy is wasted.

In air conditioners and heat pumps, it is known that varying the capacity of the compressor to match the load can be used to save a considerable amount of energy. The capacity, in turn, can be varied by varying the speed of the motor driving the compressor of the air conditioner or heat pump. It is also known that by using two motor speeds (e.g. full speed and half speed), most of the energy loss due to fractional loading can be eliminated. However, unlike fans and blowers where the torque requirement goes down significantly as the speed is reduced, for compressors the torque requirement remains fairly constant or goes down only slightly with decreases in speed. Thus, to be effective, a two-speed motor for a compressor must provide a relatively high level of torque at both low and high speeds.

Several approaches have been suggested to control a single phase motor at two or more operational speeds. In a first approach, multiple taps in the main or auxiliary windings of the motor are used. In another approach, the input voltage to the motor is reduced by wave chopping using solid-state switches. Unfortunately, both of these approaches result in relatively low efficiency and significant harmonics on the utility side.

In still another approach, single phase inverters using Insulated Gate Transistors and microprocessors are used to produce a single phase reduced frequency signal. The reduced frequency signal is then passed through the main and auxiliary windings (including the capacitor) to operate a PSC motor at low speed. While this technique may provide a relatively high efficiency when torque requirements at lower speeds are minimal, the use of single phase inverters is unsuitable for compressors where the torque requirement remains fairly constant as speed decreases. Specifically, for controllers using single phase inverters, torque drops off significantly with decreases in motor speed due to the auxiliary winding capacitor that is tuned for operational efficiency at the higher speed. Additionally, controllers using single phase inverters are relatively expensive and highly complex, and generate relatively high harmonics and peak currents which can cause problems for the utility and adversely affect nearby devices (e.g. televisions, etc).

In light of the above, it is an object of the present invention to provide a speed controller for a single phase motor that can be used in air conditioning and heat pump applications. It is another object of the present invention to provide a speed controller for a permanent split capacitance motor that produces a relatively high torque at relatively low motor speeds. It is yet another object of the present invention to provide a speed controller for a single phase motor which draws a nearly sinusoidal input current (i.e. from the utility) without generating harmonics on the input line, and does not generate high peak currents. Yet another object of the present invention is to provide a speed controller for a single phase motor that can transition from a first speed to a second speed in response to a signal from a thermostat.

SUMMARY OF THE INVENTION

The present invention is directed to a speed controller for a single phase motor such as a permanent split capacitor (PSC) motor. Specific applications of the present invention include, but are not limited to, air conditioning systems and heat pumps. Functionally, the speed controller can be used to operate a single phase motor at a lower, more energy efficient speed during periods when the air conditioning system or heat pump is operating at fractional load.

For use with the present invention, the PSC motor includes a main winding and an auxiliary winding. Typically, the auxiliary winding of the PSC motor is connected to a capacitor that is tuned for operational efficiency at a first motor speed, $n_1$. As described further below, the speed controller of the present invention allows the motor to be operated at the first speed, $n_1$, and at least one lower speed, $n_2$.

In functional overview, the controller causes the motor to operate at the high speed, $n_1$, by passing an AC current having a fixed frequency, $f_1$, through both the main and auxiliary windings of the motor. On the other hand, to operate the motor at the low speed, $n_2$, the controller passes AC waveforms having reduced frequency, such as $f_1/2$, through the main and auxiliary windings. In low speed mode, the controller passes a waveform through the auxiliary winding that bypasses the auxiliary winding capacitor and is shifted in phase by 90 degrees from the waveform passed through the main winding. In one embodiment, an AC waveform having a voltage, $V_1$, of approximately 230V and a frequency, $f_1$, of approximately 60 hertz is used to operate the motor at the high speed, $n_1$. In this embodiment, AC waveforms having a voltage, $V_2$, of approximately 115V and a frequency, $f_2$, of approximately 30 hertz are used to operate the motor at the low speed, $n_2$. The reduced voltage at the low speed prevents current saturation in the motor.

To produce the waveforms described above, the controller is connected to an AC power source. For use with the present invention, the AC power source can be a split source having output terminals A, O and B wherein the signal across terminals AO differs in phase from the signal across terminals OB by approximately 180 degrees. For use with the embodiment described above, a suitable split source has a frequency of approximately 60 hertz and a voltage, $V_{AB}$, of approximately 230V with split voltages, $V_{OA}$ and $V_{OB}$, of approximately 115V each. To operate the motor at the high speed, $n_1$, the controller places both the main and auxiliary windings across the terminals AB.

To operate the motor at the low speed, $n_2$, the controller generates reduced frequency waveforms from the split source. More specifically, the controller uses selected half cycles from the signals generated across terminals OA and OB to produce the reduced frequency waveforms. For example, to energize the main winding for low speed motor operation, the controller first passes a half cycle originating across terminals OA through the main winding, then skips a half cycle, then passes a half cycle originating across terminals OB through the main winding, then skips a half cycle. This sequence of selected half cycles is continued to pass a reduced frequency waveform having a frequency, f/2, through the main winding (note: f is the frequency of the signal originating across terminals OA and OB). Thus, for the split source described above, the reduced frequency waveform has a frequency of approximately 30 hertz and a voltage of approximately 115V.

As indicated above, in low speed mode, the controller passes a waveform through the auxiliary winding that bypasses the auxiliary winding capacitor and is shifted in phase by 90 degrees from the waveform passed through the main winding. To energize the auxiliary winding in this manner, the controller first skips a half cycle, then passes a half cycle originating across terminals OB through the auxiliary winding, then skips a half cycle, and then passes a half cycle originating across terminals OA through the auxiliary winding. This sequence is continued to pass a reduced frequency waveform having a frequency, f/2, through the auxiliary winding. The auxiliary winding sequence is synchronized with the sequence described above for the main winding to ensure that the waveform passed through the auxiliary winding is shifted in phase by 90 degrees from the waveform passed through the main winding.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
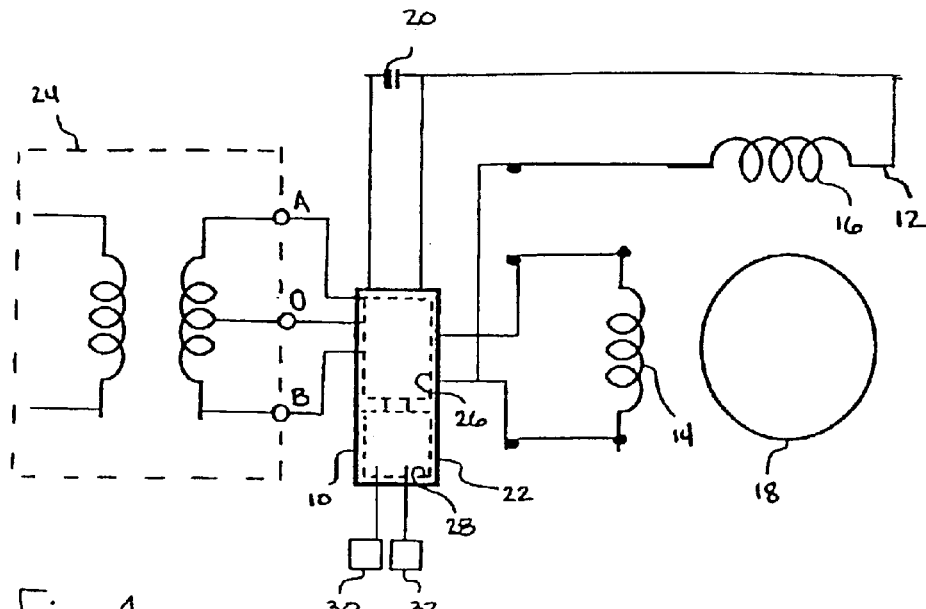
FIG. 1 is a schematic diagram of a speed control system for operating a single phase motor at a plurality of speeds shown operationally connected to a single phase motor.

Referring to FIG. 1, a speed control system 10 for operating a single phase motor at a plurality of speeds is shown operationally connected to a permanent split capacitance (PSC) motor 12. As shown, the PSC motor 12 includes a main winding 14 and an auxiliary winding 16 for establishing magnetic fields to turn the rotor 18, which is typically a squirrel cage rotor. Also shown, the auxiliary winding 16 is connected to a capacitor 20 that is tuned for operational efficiency at a first motor speed, $n_1$. As described further below, the speed control system 10 allows the PSC motor 12 to be operated at the first speed, $n_1$, and at least one lower speed, $n_2$.

Continuing with reference to FIG. 1, it can be seen that the speed control system 10 is electrically connected to the PSC motor 12 and includes a speed controller 22 and an AC power source 24 that can be a split source, as shown. From FIG. 1, it can be seen that power is first transferred to the speed controller 22, which in turn, directs the power to the PSC motor 12. FIG. 1 further shows that the speed controller 22 includes a switching circuit 26 that is driven by a control circuit 28 which is typically a microprocessor or programmable logic circuit. Inputs to the control circuit 28 can include, but are not limited to, an input signal from a thermostat 30, and a manual input signal, for example, from a keypad 32. In response to an input signal, the control circuit 28 can reconfigure the switching circuit 26 to change the speed of the PSC motor 12.

Figure 2:
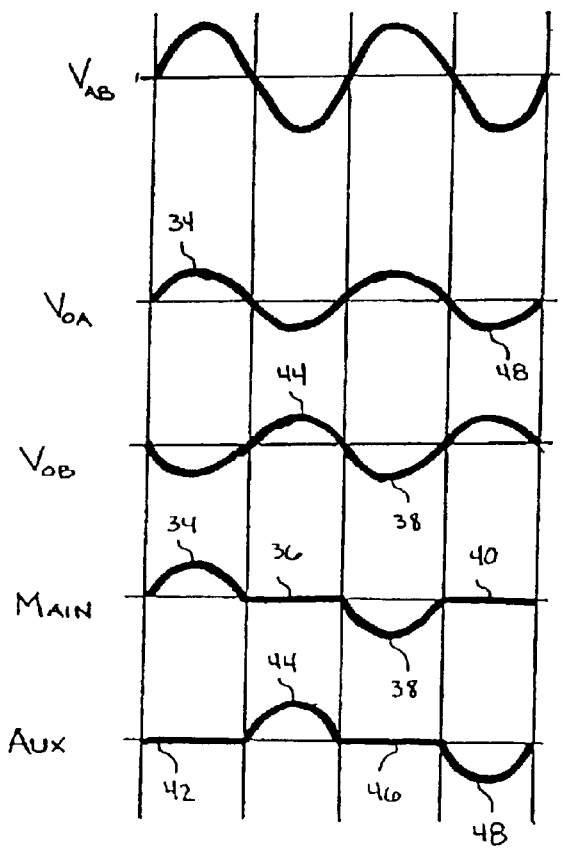
FIG. 2 is a diagram showing a series of waveforms including waveforms generated across the terminals of a split source and reduced frequency waveforms that can be generated by using selected half cycles from the split source.

A better appreciation of the AC power source 24 can be obtained with cross-reference to FIGS. 1 and 2. Specifically, FIG. 1 shows that the AC power source 24 can be a split source having output terminals A, O and B. FIG. 2 shows the waveforms generated across the terminals AB, OA and OB, designated respectively $V_{AB}$, $V_{OA}$ and $V_{OB}$, all of which have a common frequency, $f_1$. As shown, the signal across terminals AO differs in phase from the signal across terminals OB by approximately 180 degrees. Further, the peak voltage, $V_{AB}$, is approximately twice the magnitude of the individual split voltages, $V_{OA}$ and $V_{OB}$.

One example of a suitable split source for use in the system 10 is a residential load center with the load center neutral establishing the O terminal and the hot buses establishing the A and B terminals. For a typical U.S. residence, the load center provides AC power having a frequency of approximately 60 hertz, a voltage, $V_{AB}$, of approximately 230V with split voltages $V_{OA}$ and $V_{OB}$ of approximately 115V each. Typical home appliances requiring 120V can be operated across either terminals O and A or terminals O and B and a typical air conditioner is placed across terminals A and B and uses 240V. Alternatively, as illustrated in FIG. 1, a split source can be generated from a single phase AC supply (of any voltage or frequency) using a transformer having a center tap.

To operate the PSC motor 12 at the high speed, $n_1$, the speed controller 22 places both the main winding 14 and auxiliary winding 16 across the terminals AB of the AC power source 24. To operate the PSC motor 12 at the low speed, $n_2$, the speed controller 22 generates reduced frequency waveforms, such as exemplary waveforms labeled MAIN and AUX in FIG. 2, from the split source waveforms $V_{OA}$ and $V_{OB}$. The reduced frequency waveforms, MAIN and AUX, are then directed through the main winding 14 and auxiliary winding 16, respectively, to operate the PSC motor 12 at the low speed, $n_2$.

To generate the reduced frequency waveforms, the speed controller 22 uses selected half cycles from the signals generated across terminals OA and OB. For example, to generate the MAIN waveform shown in FIG. 2, the speed controller 22 uses a positive half cycle 34 originating across terminals OA, then skips a half cycle 36, then uses a negative half cycle 38 originating across terminals OB, then skips a half cycle 40. This sequence of selected half cycles is repeated again and again to generate the reduced frequency MAIN waveform having a frequency, $f_1/2$, and voltage equal to the voltage across terminals OA and OB.

Similarly, to generate the AUX waveform shown in FIG. 2, the speed controller 22 first skips a half cycle 42, then uses a positive half cycle 44 originating across terminals OB, then skips a half cycle 46, then uses a negative half cycle 48 originating across terminals OA. This sequence of selected half cycles is repeated again and again to generate the reduced frequency AUX waveform having a frequency, $f_1/2$, and voltage equal to the voltage across terminals OA and OB. During low speed operation, the speed controller 22 passes the AUX waveform through the auxiliary winding 16, bypassing the auxiliary winding capacitor 20. Specifically, the auxiliary winding capacitor 20 can be bypassed because the AUX waveform is shifted in phase by 90 degrees from the MAIN waveform, as shown in FIG. 2. In a typical PSC motor 12, the auxiliary winding capacitor 20 is sized for operational efficiency at the higher motor speed, $n_1$. As indicated above, passing a single phase, reduced frequency waveform through both the main winding 14 and auxiliary winding 16 with the auxiliary winding capacitor 20 connected results in a substantial torque reduction relative to the higher motor speed, $n_1$. To prevent this torque reduction, the system 10 bypasses the auxiliary winding capacitor 20 and uses an AUX waveform that is shifted in. phase by 90 degrees from the MAIN waveform. Although AUX and MAIN waveforms having frequency $f_1/2$ are shown in FIG. 2, those skilled in the pertinent art will appreciate from FIG. 2 that AUX and MAIN waveforms having other reduced frequencies, such as $f_1/4$, wherein the AUX waveform is shifted in phase by 90 degrees from the MAIN waveform, could be generated from the split source by skipping additional half cycles.

Figure 3:
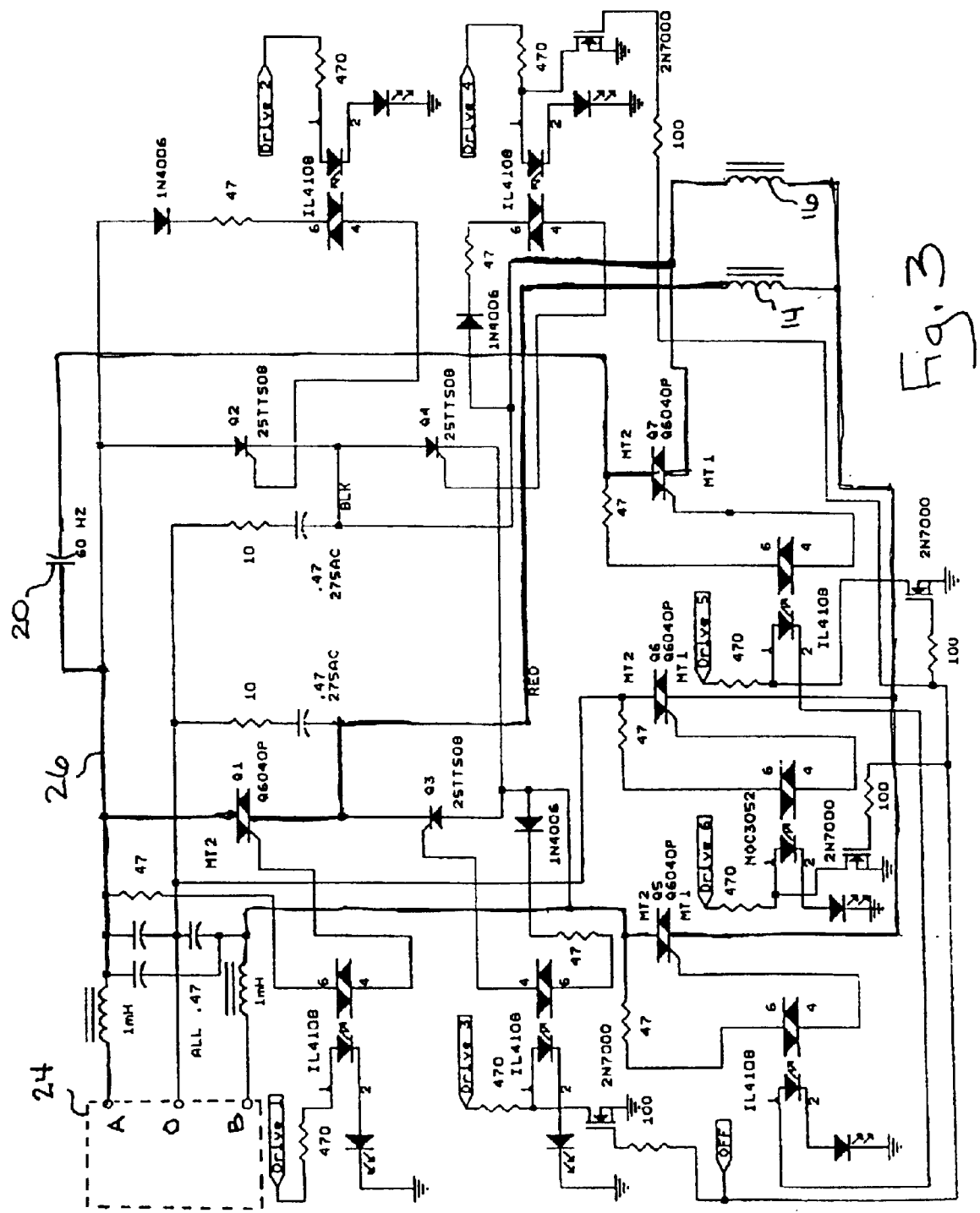
FIG. 3 is a schematic diagram of a switching circuit for use in a speed controller.

FIG. 3 shows an electrical schematic of a switching circuit 26 for use in the system 10. Inputs to the switching circuit 26 from the control circuit 28 are labeled DRIVES 1–6 and OFF. As further shown, the switching circuit 26 is connected to the AC power source 24. Further, the main winding 14, auxiliary winding 16 and auxiliary winding capacitor 20 are shown connected to the switching circuit 26 in FIG. 3. In functional overview, with cross-reference to FIGS. 2 and 3, the switching circuit 26 can be controlled to operate the PSC motor 12 at high speed, $n_1$, by passing the $V_{AB}$ waveform through both the main winding 14 and auxiliary winding 16 with the auxiliary winding capacitor 20 connected. Also, the switching circuit 26 is responsive to the control circuit 28 to operate the PSC motor 12 at low speed, $n_2$, by passing the MAIN waveform through the main winding 14 and the AUX waveform through auxiliary winding 16 with the auxiliary winding capacitor 20 disconnected.

To generate the required waveforms and switch the PSC motor 12 between high speed and low speed operation, the switching circuit 26 shown in FIG. 3 includes seven thyristors that are labeled Q1, Q2, 03, Q4, Q5, Q6 and Q7. For the embodiment shown in FIG. 3, thyristors Q2, Q3 and Q4 are silicon controlled rectifiers (SCR) and thyristors Q1, Q5, Q6 and Q7 are TRIACS. As further shown, opto-couplers are used between the thyristors and the control circuit 28. As shown, the OFF signal turns off the drive to the optos for Q3, Q4, Q5, Q6 and Q7. In an alternate embodiment not shown, the TRIAC Q7 can be replaced with a relay.

To operate the PSC motor 12 at high speed, $n_1$, thyristors Q1, Q5, and Q7 are closed with thyristors Q2, Q3, Q4, and Q6 open. The closure of Q7 connects the auxiliary winding capacitor 20 to the auxiliary winding 16. The closure of Q1 and Q5 places both the main winding 14 and auxiliary winding 16 across terminals AB.

To operate the PSC motor 12 at the low speed, $n_2$, the switching circuit 26 follows a sequence including selected positive half cycles, negative half cycles and skipped half cycles for both the main winding 14 and auxiliary winding 16. Beginning with the main winding 14, positive half cycles are passed through the main winding 14 by closing Q1 and Q6. This places the main winding 14 across the terminals OA. Note: the reduced voltage at the low speed prevents current saturation in the PSC motor 12. To skip a half cycle on the main winding 14, Q1 and Q3 are opened. Negative half cycles are passed through the main winding 14 by closing Q3 and Q6. This places the main winding 14 across terminals OB. For the auxiliary winding 16, positive half cycles are passed through the auxiliary winding 16 by closing Q2 and Q6. This places the auxiliary winding 16 across terminals OB. To skip a half cycle on the auxiliary winding 16, Q2 and Q4 are opened. Negative half cycles are passed through the auxiliary winding 16 by closing Q4 and Q6. This places the auxiliary winding 16 across terminals OB.

The control circuit 28 controls the thyristors Q1, Q2, Q3, Q4, Q5, Q6 and Q7 through the DRIVES 1–6 and OFF to simultaneously pass the AUX and MAIN waveforms shown in FIG. 2 through the auxiliary winding 16 and main winding 14, respectively. Specifically, a positive half cycle 34 is first passed through the main winding 14 while the auxiliary winding 16 skips a half cycle. This is accomplished by the switching circuit 26 with Q1 and Q6 closed and Q2 and Q4 open. Next, the main winding 14 skips a half cycle and a positive half cycle 44 is passed through the auxiliary winding 16. This is accomplished by the switching circuit 26 with Q2 and 06 closed and Q1 and Q3 open. Next, a negative half cycle 38 is passed through the main winding 14 and the auxiliary winding 16 skips a half cycle. This is accomplished by the switching circuit 26 with Q3 and Q6 closed and Q2 and Q4 open. To complete the first cycle, the main winding 14 skips a half cycle and a negative half cycle is passed through the auxiliary winding 16. This is accomplished by the switching circuit 26 with Q4 and Q6 closed and Q1 and Q3 open.

Figure 4:
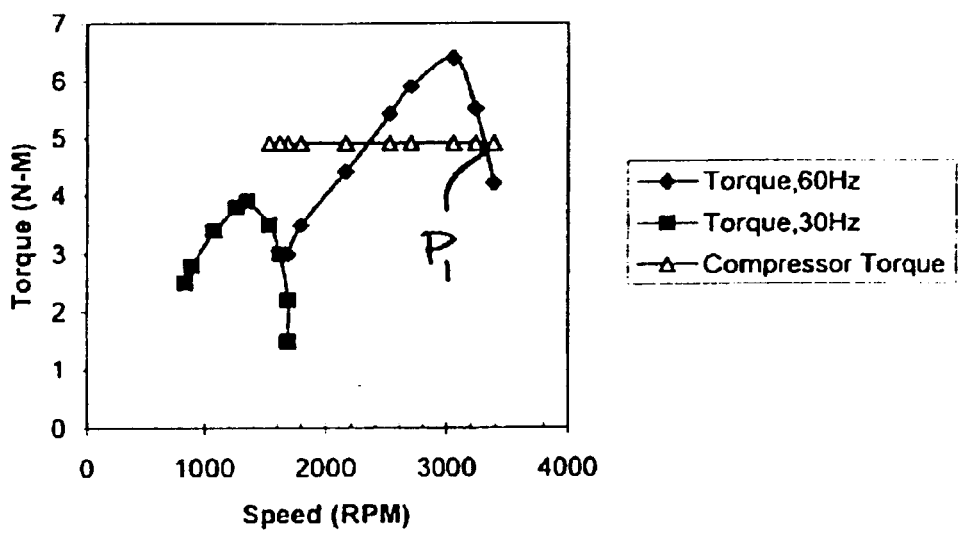
FIG. 4 is a graph showing torque output as a function of motor speed for a prior art controller having a single phase inverter with a graph showing torque requirement as a function of motor speed for a typical compressor superimposed thereon.
Figure 5:
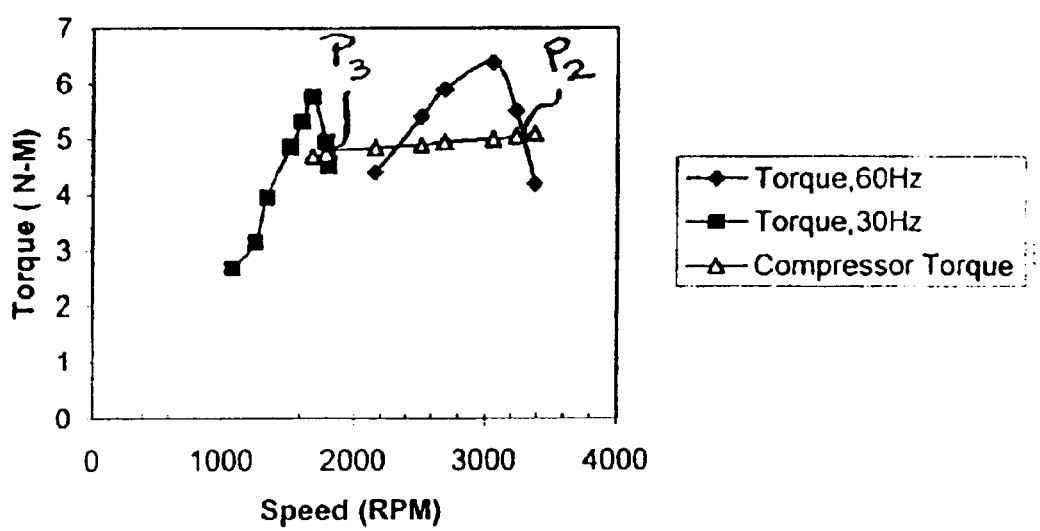
FIG. 5 is a graph showing torque output as a function of motor speed for the controller of the present invention with a graph showing torque requirement as a function of motor speed for a typical compressor superimposed thereon.

The speed control system 10 produces a relatively high torque at the low speed, $n_2$, allowing the speed control system 10 to be used in air conditioning and heat pump applications. This is not necessarily the case for a prior art controller having a single phase inverter. Specifically, as shown in FIG. 4, torque output for a prior art controller having a single phase inverter at low speeds fails to meet the torque requirement of a typical compressor at low speeds. Thus, for the prior art controller having a single phase inverter, the torque requirement is met for 60 hz operation and the compressor can operate at point P1, but the compressor torque requirement is not met during 30 hz operation. On the other hand, as shown in FIG. 5, the torque output of speed control system 10 meets the torque requirement for a typical compressor at both high speed using 60 Hz (point P2) and low speeds using 30 Hz (point P3). In greater detail, FIG. 5 shows measured values of torque output as a function of motor speed for the speed control system 10 connected to a 3 ton Bristol Compressor having a motor rated at 3600 rpm, 230 Volts and 60 hz.

While the particular Controller For Air Conditioners And Heat Pumps as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A speed controller system for a single phase motor having a capacitor, an auxiliary winding connected to the capacitor, and a main winding, said speed controller system comprising:

means for providing first and second AC signals of frequency, $f_1$ with said first AC signal differing in phase from said second AC signal by approximately 180 degrees;

means for combining said first and second AC signals and directing said combined signal through the main and auxiliary windings to operate the motor at a first speed, $n_1$;

means for generating third and fourth signals of frequency f/N, where N is an integer greater than one, with said fourth signal differing in phase from said third signal by 90 degrees, and wherein said third and fourth signals are generated using selected half cycles from said first and second signals; and means for disconnecting the capacitor from the auxiliary winding and directing said third signal through the main winding and said fourth signal through the auxiliary winding to operate the motor at a second speed, $n_2$, with $n_2 < n_1$.

2. A system as recited in claim 1 wherein said means for providing first and second AC signals is a split source.

3. A system as recited in claim 1 wherein said split source comprises a residential load center.

4. A system as recited in claim 1 wherein said first and second AC signals have a voltage of approximately 115 Volts and said combined signal has a voltage of approximately 230 volts.

5. A system as recited in claim 1 wherein N=2.

6. A system as recited in claim 1 wherein said means for generating third and fourth signals comprises a circuit having a plurality of thyristors.

7. A system as recited in claim 6 wherein said plurality of thyristors comprises at least one silicon-controlled rectifier.

8. A system as recited in claim 6 wherein said plurality of thyristors comprises at least one TRIAC.

9. A system as recited in claim 1 wherein said frequency, f, is approximately 60 hertz.

10. A speed controller for operating a single phase motor with power from a source providing first and second AC signals of frequency, f, with the first AC signal differing in phase from the second AC signal by approximately 180 degrees, the motor having a capacitor, an auxiliary winding connected to the capacitor, and a main winding, said speed controller comprising:

a first means for combining said first and second AC signals and directing said combined signal through the main and auxiliary windings to operate the motor at a first speed, $n_1$;

a second means for generating third and fourth signals having frequency f/N, where N is an integer greater than one, with said fourth signal differing in phase from said third signal by 90 degrees and wherein said third and fourth signals are generated using selected half cycles from said first and second signals, and for disconnecting the capacitor from the auxiliary winding and directing said third signal through the main winding and said fourth signal through the auxiliary winding to operate the motor at a second speed, $n_2$, with $n_2 < n_1$; and means for switching between said first means and said second means to change the speed of the motor between said first speed, $n_1$, and said second speed, $n_2$.

11. A speed controller as recited in claim 10 wherein said switching means comprises a microprocessor.

12. A speed controller as recited in claim 10 wherein said switching means is responsive to a signal input from a thermostat to change the speed of the motor.

13. A speed controller as recited in claim 10 wherein the first and second AC signals have a voltage of approximately 115 Volts and said combined signal has a voltage of approximately 230 volts.

14. A speed controller as recited in claim 10 wherein N=2.

15. A speed controller as recited in claim 10 wherein said means for generating third and fourth signals comprises a circuit having a plurality of thyristors.

16. A speed controller as recited in claim 10 wherein said frequency, f, is approximately 60 hertz.

17. A method for operating a single phase motor at a plurality of speeds, the motor having a capacitor, an auxiliary winding connected to the capacitor, and a main winding, said method comprising the steps of:

providing first and second AC signals of frequency, f, with said first AC signal differing in phase from said second AC signal by approximately 180 degrees;

combining said first and second AC signals and directing said combined signal through the main and auxiliary windings to operate the motor at a first speed, $n_1$;

generating third and fourth signals of frequency f/N, where N Is an integer greater than one, with said fourth signal differing in phase from said third signal by 90 degrees and wherein said third and fourth signals are generated using selected half cycles from said first and second signals; and disconnecting the capacitor from the auxiliary winding and directing said third signal through the main winding and said fourth signal through the auxiliary winding to operate the motor at a second speed, $n_2$, with $n_2 < n_1$.

18. A method as recited in claim 17 wherein said step of generating third and fourth signals comprises the steps of:

using a half cycle from said first AC signal;
skipping a half cycle;
using a half cycle from said second AC signal; and
skipping a half cycle;
to generate the third signal and the steps of:
skipping a half cycle;
using a half cycle from said second AC signal;
skipping a half cycle; and
using a half cycle from said first AC signal;
to generate said fourth signal.

19. A method as recited in claim 17 wherein N=2.

20. A method as recited in claim 17 wherein said frequency, f, is approximately 60 hertz.

* * * * *

UNITED STATES PATENT AND TRADEMARK OFFICE
CERTIFICATE OF CORRECTION

PATENT NO.     : 6,713,986 B1
DATED          : March 30, 2004
INVENTOR(S)    : Tumkur S. Jayadev and James C. Sprout It is certified that error appears in the above-identified patent and that said Letters Patent is hereby corrected as shown below:

<u>Column 6,</u>
Line 30, delete "06" insert -- Q6 --

<u>Column 7,</u>
Line 7, delete "$f_1$" insert -- f, --

<u>Column 8,</u>
Line 35, delete "Is" insert -- is --

Signed and Sealed this

Eighth Day of March, 2005

JON W. DUDAS
*Director of the United States Patent and Trademark Office*